US009037368B2

(12) United States Patent  (10) Patent No.: US 9,037,368 B2
Miglioranza  (45) Date of Patent: May 19, 2015

(54) METHOD FOR ELECTRONICALLY CONTROLLING A BICYCLE GEARSHIFT AND ELECTRONICALLY SERVO-ASSISTED BICYCLE GEARSHIFT

(71) Applicant: Campagnolo S.r.l., Vicenza (IT)

(72) Inventor: Federico Miglioranza, Schio (VI) (IT)

(73) Assignee: Campagnolo S.r.l., Vicenza (IT)

( * ) Notice: Subject to any disclaimer, the term of this patent is extended or adjusted under 35 U.S.C. 154(b) by 0 days.

(21) Appl. No.: 13/948,686

(22) Filed: Jul. 23, 2013

(65) Prior Publication Data

US 2014/0032067 A1 Jan. 30, 2014

(30) Foreign Application Priority Data

Jul. 23, 2012 (IT) .............................. MI2012A1279

(51) Int. Cl.
| | | |
|---|---|---|
| G06F 7/00 | (2006.01) | |
| F16H 61/02 | (2006.01) | |
| B62M 25/08 | (2006.01) | |
| F16H 9/04 | (2006.01) | |
| B62M 9/122 | (2010.01) | |
| B62M 9/132 | (2010.01) | |

(52) U.S. Cl.
CPC ............ *F16H 61/0213* (2013.01); *B62M 9/122* (2013.01); *B62M 9/132* (2013.01); *B62M 25/08* (2013.01); *F16H 9/04* (2013.01)

(58) Field of Classification Search
CPC ........ B62M 9/122; B62M 9/132; B62M 9/12; B62M 9/105; B62M 25/08; F16H 9/04; F16H 61/0213

USPC ............... 701/36, 49, 60, 64; 474/78, 80, 152
See application file for complete search history.

(56) References Cited

U.S. PATENT DOCUMENTS 5,655,982 A * 8/1997 Fyfe ................................ 474/80
6,679,797 B2 1/2004 Valle
(Continued)

FOREIGN PATENT DOCUMENTS

| EP | 1426284 A1 | 6/2004 |
| EP | 1500582 A1 | 1/2005 |

(Continued)

OTHER PUBLICATIONS

Italian Search Report and Written Opinion in Italian Application No. IT MI2012001279, Apr. 12, 2013 with English translation.

*Primary Examiner* — Gertrude Arthur Jeanglaud
(74) *Attorney, Agent, or Firm* — Volpe and Koenig, P.C.

(57) ABSTRACT

A method for electronically controlling a bicycle gearshift comprising at least one derailleur is disclosed, comprising the sequential steps of:
a) imparting a movement on the derailleur of the gearshift until the derailleur is in an intended position;
b) waiting for a predetermined time period,
c) performing a check whether the derailleur is in the intended position, within a possible predetermined tolerance,
d) in case said check has a negative outcome, imparting a movement on the derailleur of the gearshift until the derailleur is in the intended position.
A derailleur and an electronically servo-assisted bicycle gearshift comprising control electronics comprising modules adapted to carry out the method outlined above are also disclosed.

14 Claims, 5 Drawing Sheets

(56) References Cited

U.S. PATENT DOCUMENTS

2005/0043129 A1* 2/2005 Guderzo .................. 474/78
2013/0331210 A1* 12/2013 Wickliffe et al. ............ 474/78

FOREIGN PATENT DOCUMENTS

EP 2003051 A2 12/2008
EP 2551182 A1 1/2013

* cited by examiner

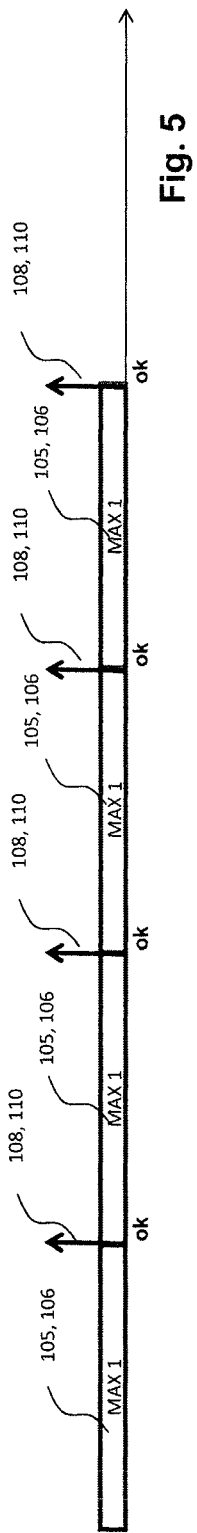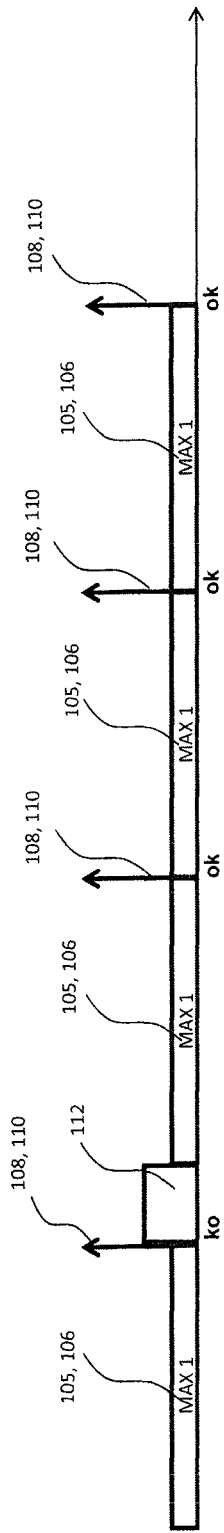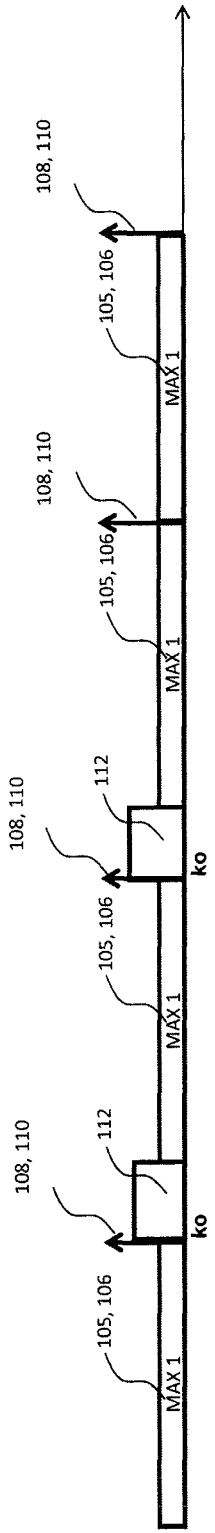

METHOD FOR ELECTRONICALLY CONTROLLING A BICYCLE GEARSHIFT AND ELECTRONICALLY SERVO-ASSISTED BICYCLE GEARSHIFT

FIELD OF INVENTION

The present invention relates to a method for electronically controlling a bicycle gearshift, and to an electronically servo-assisted bicycle gearshift.

BACKGROUND

A motion transmission system in a bicycle comprises a chain extending between toothed wheels associated with the axle of the pedal cranks and with the hub of the rear wheel. When there is more than one toothed wheel at least one of axle of the pedal cranks and the hub of the rear wheel, and the motion transmission system is therefore provided with a gearshift, a front derailleur and/or a rear derailleur are provided for. In the case of an electronically servo-assisted gearshift, each derailleur comprises a chain guide element, also known as cage, movable to move the chain among the toothed wheels in order to change the gear ratio, and an electromechanical actuator to move the chain guide element. The actuator in turn typically comprises a motor, typically an electric motor, coupled with the chain guide element through a linkage such as an articulated parallelogram, a rack system or a worm screw system, as well as a sensor of the position, speed and/or acceleration of the rotor or of any moving part downstream of the rotor, down to the chain guide element itself. It is worthwhile noting that slightly different terminology from that used in this context is also in use.

Control electronics changes the gear ratio automatically, for example based on one or more detected variables, such as the travel speed, the cadence of rotation of the pedal cranks, the torque applied to the pedal cranks, the slope of the travel terrain, the heart rate of the cyclist and similar, and/or based on commands manually input by the cyclist through suitable control members, for example levers and/or buttons.

In order to drive the actuator, instead of assuming that the toothed wheels are equally axially spaced and therefore moving the chain guide element always by the same amount, the control electronics use a table of values containing, for each toothed wheel, the value that a variable of the derailleur must assume to position the chain in engagement with the toothed wheel. Such a value can be a differential value with respect to the adjacent toothed wheel, or it can be an absolute value with respect to a reference, for example with respect to a reference toothed wheel or to an end of stroke condition or to a condition of lack of excitation of the motor.

From the point of view of magnitude, the command value of the actuator can for example be the distance traveled by a mobile point taken as a reference on the derailleur, the number of steps or revolutions that the motor should be made to perform, a length of excitation time of the motor, the value of a supply voltage of a motor having an excursion proportional to the voltage, furthermore it can be the value emitted by the sensor associated with the motor, a numerical value stored in a register and representative of one of the aforementioned quantities, etc.

In particular, the motors of the actuators can be driven for a number of steps or for a length of excitation time or with a voltage that are appropriate for each upward or downward gearshifting and then automatically stopped, while the sensors are used to supply a feedback signal to the control electronics so that it can possibly take care of actuating the motors of the actuators again in case the intended position has not been reached, namely in case the aforementioned variable of the derailleur has not assumed the table value. This may for example be due to the fact that the resistant torque offered by the derailleur, which to a certain extent depends on how the cyclist is pedaling, was too high, greater than the maximum torque that can be delivered by the motors through the linkage.

The values of said table of values are nominal values, set in the factory, which take the number of toothed wheels in the derailleur (front or rear) and the respective thicknesses and pitches into account. Typically, such nominal values provide that, in the absence of the driving signal of the actuator, namely with command value at zero, the chain is in engagement with the toothed wheel having the smallest diameter, although as can be seen from the aforementioned examples, this condition is not necessary.

There are also some known gearshifts, for example from EP 1 426 284 A1 and from European patent application 11425204.2 not yet published at the priority date of the present application, wherein the nominal command values of the actuator are replaced in use by actual command values of the actuator, to take into account the variations in position of the toothed wheels, with respect to the nominal ones of a gearshift taken as a reference, due to various factors.

In the present description reference will be broadly made to "command values of the actuator", meaning the actual ones where present, or the nominal ones, referring to a reference gearshift, in case the actual ones are not present.

More specifically, EP 1 426 284 A1 disclosed an electronically servo-assisted gearshift wherein a setting operating mode, an adjustment operating mode and a normal ride mode are implemented. In the setting mode, the chain is brought into alignment with a single preselected toothed wheel, preferably the one having the smallest diameter, and a biunique correspondence is set between the physical position of the actuator and the logic value associated with the gear ratio relative to the preselected toothed wheel, preferably zeroing a counter to the content of which the nominal values of the table are referred. In the adjustment mode, the chain is brought into engagement and alignment with a preselected toothed wheel and an adjustment variable ("offset") of the logic value associated with the gear ratio relative to the preselected toothed wheel is set. During the normal ride mode, the actuator is moved into physical positions determined by the logic values associated with the toothed wheels as adjusted by the adjustment variables. In this way, the misalignments between the chain and one or more toothed wheels are compensated, caused for example by impacts or collisions or by small differences between the size and/or the position of a replaced toothed wheel and the replacement one.

Moreover, European patent application 11425204.2 discloses in particular a method for electronically controlling a bicycle gearshift and a gearshift that implements it, comprising the steps of:

a) detecting a first actual command value of an actuator such as to position a motion transmission chain in engagement with a first of at least three coaxial toothed wheels, and a second actual command value of the actuator such as to position the chain in engagement with a second of said toothed wheels, b) for each toothed wheel, determining a nominal command value of the actuator theoretically such as to position the chain in engagement with said toothed wheel, and c) computing an actual command value of said actuator at least for each of said toothed wheels other than the first and second toothed wheel, based on said nominal command values and said first and second actual command value.

According to such a document, in this way it is possible to take into account not only the size differences of the components of the frame and the mounting tolerances of the gearshift, but also size differences inside the pack of toothed wheels with respect to the theoretical reference gearshift on which the nominal values are based.

The Applicant has now perceived that, after the derailleur has reached the intended position at the end of its movement actuating a gearshifting—also when a feedback actuation of the derailleur is used and therefore the aforementioned movement includes movements correcting the resistant torque effect—, unintentional movements of the derailleur can follow, due to the elasticity of the linkage arranged between the motor of the actuator and the chain guide element, as well as due to vibrations due to the irregularity of the road surface. In the present description and in the attached claims, the derailleur is meant to be in intended position when the aforementioned variable of the derailleur has assumed the command value relative to the toothed wheel currently engaged.

Such unintentional movements, even when they can be considered micro-displacements, can cause imprecisions in the actuation of subsequent gearshifting, particularly when the command values are expressed as differential values between adjacent toothed wheels and subsequent undesired movements can add to one another. Furthermore, such movements from the intended position can cause an imprecise engagement if not even the disengagement of the chain from the toothed wheel, and/or a greater wear of the mechanical parts.

The technical problem at the basis of the invention is to counteract the undesired displacements of a derailleur of a bicycle gearshift.

SUMMARY

In an aspect thereof, the invention concerns a method for electronically controlling a bicycle gearshift comprising at least one derailleur, comprising the sequential steps of:

a) imparting a movement on the derailleur of the gearshift until the derailleur is in an intended position;

b) waiting for a predetermined time period, c) performing a check whether the derailleur is in the intended position, within a possible predetermined tolerance, d) in case said check has a negative outcome, imparting a movement on the derailleur of the gearshift until the derailleur is in the intended position. Preferably, step a) of imparting a movement on the derailleur comprises actuating a motor of the derailleur and stopping it automatically when it is assumed that the derailleur is in an intended position, and carrying out a feedback control of the derailleur obtaining a feedback signal from at least one sensor, and optionally actuating the motor again in case the intended position has not been reached.

Said step a) can be carried out as a consequence of a gearshifting request signal or to carry out a repositioning following a negative outcome of the check whether the position of the derailleur is the intended one, within a possible predetermined tolerance. In other words, even after step d) has been carried out, steps b), c), d) can be carried out.

Preferably, between two successive executions of said step a) to carry out a respective gearshifting, said step b) of waiting and a step c1) of reading an actual position of the derailleur, as well as optionally said steps c) and d), are carried out cyclically, wherein said predetermined time period is comparatively long, preceded by at least one execution of said steps b), c), d), wherein said predetermined time period is comparatively short.

Preferably, step b) of waiting for a predetermined time period comprises monitoring the passing of time with at least one timer.

Typically, the intended position of the derailleur is a position that allows the positioning of a motion transmitting chain into engagement with a first of at least two coaxial toothed wheels, and it is evaluated based on a current value of a variable of the derailleur, wherein a predetermined value of the variable of the derailleur is provided for each toothed wheel associated with the derailleur.

For the predetermined value of the variable of the derailleur for each toothed wheel, or command value, any numerical representation can be used that is representative of the condition of the derailleur in which the chain is in such a physical position as to engage on a specific toothed wheel.

Preferably, the command values are represented with a numerical representation having a proportional scale.

Preferably, step c) of checking is repeated a predetermined number of times irrespective of the outcome of each check, when said step a) is carried out to actuate a gearshifting.

Preferably, said step d) is repeated at most a predetermined number of times before a second execution of step a) actuating a gearshifting consequent to a second gearshifting request signal.

Each repetition of said step d) for the predetermined number of times can be carried out when said step c) of checking with a negative outcome is carried out after the comparatively short time period or when said step c) of checking with a negative outcome is carried out after the comparatively long time period.

Preferably, if during said step b) of waiting there is a gearshifting request signal, the intended position is updated and the execution of step a) is returned to.

In a second aspect thereof, the invention concerns an electronically servo-assisted bicycle gearshift, comprising:

a chain and toothed wheels system for transmitting motion from the axle of the pedal cranks to a driving wheel of the bicycle, said motion transmission system comprising at least two toothed wheels that are coaxial along an axis selected from the axle of the pedal cranks and the axis of the driving wheel, at least one derailleur comprising a chain guide element and an actuator of the chain guide element to move the chain in engagement with a preselected toothed wheel of said at least two coaxial toothed wheels, and control electronics comprising modules adapted to carry out the method outlined above.

Preferably, said actuator comprises a DC brush motor driven by a suitable number of "steps", each corresponding to a fraction of a revolution, more preferably to one thirty-second of a revolution.

In an aspect thereof, the invention concerns a derailleur comprising a chain guide element and an actuator of the chain guide element to move a chain in engagement with a preselected toothed wheel of at least two coaxial toothed wheels, and control electronics comprising modules adapted to carry out the method outlined above.

In an aspect thereof, the invention concerns a bicycle comprising an electronically servo-assisted bicycle gearshift as described above.

BRIEF DESCRIPTION OF THE DRAWINGS

Further features and advantages of the present invention will become clearer from the following detailed description of some preferred embodiments thereof, made with reference to the attached drawings. In the drawings:

FIGS. 5-10 are schematic time charts illustrating the operation of the electronic gearshift controlled according to the flow chart of FIG. 4.

DETAILED DESCRIPTION OF PREFERRED EMBODIMENTS

Figure 1:
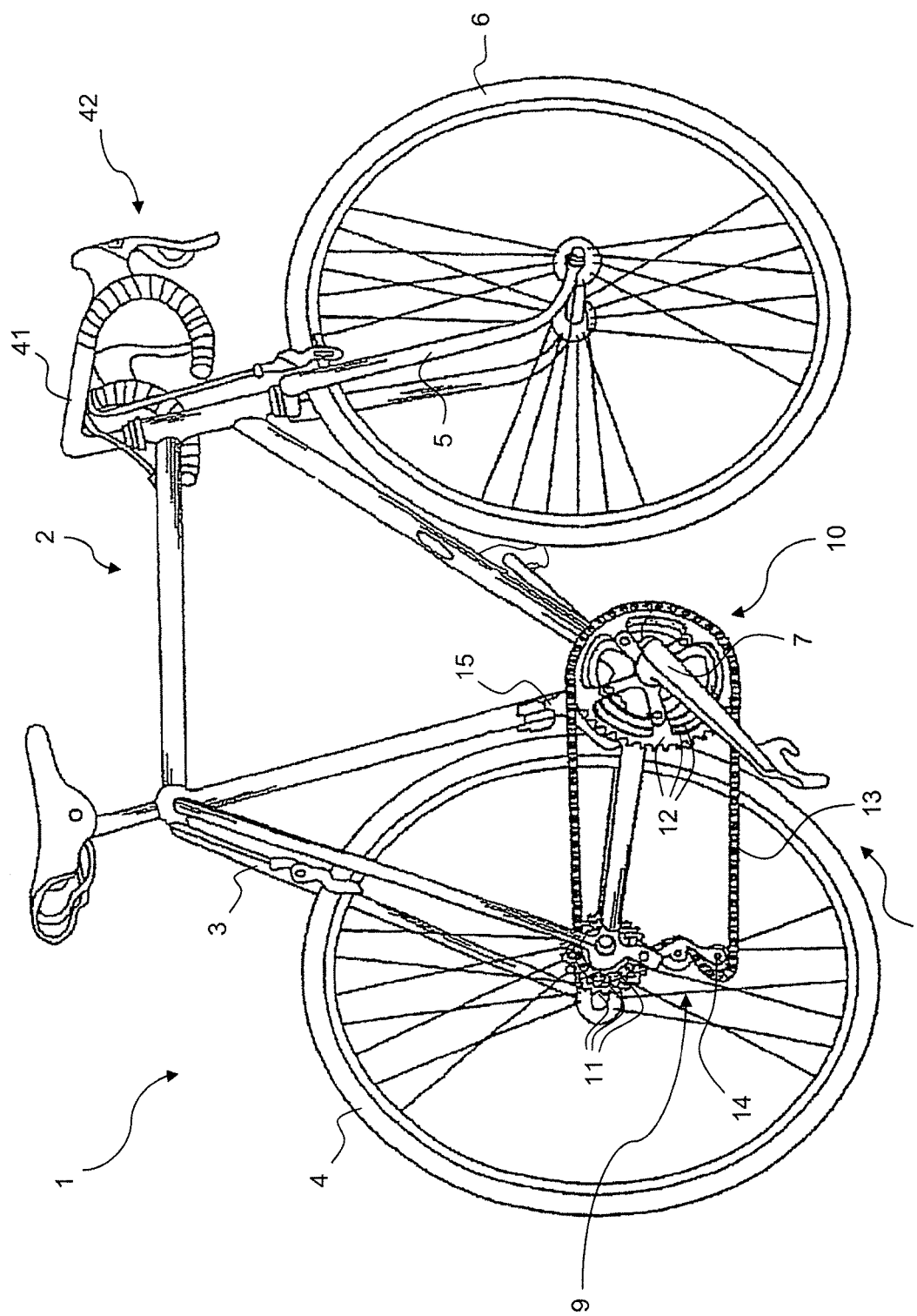
FIG. 1 schematically illustrates a perspective view of a bicycle equipped with an electronically servo-assisted gearshift according to the present invention.

With reference to FIG. 1, a bicycle 1, in particular a racing bicycle, includes a frame 2 formed in a known way of tubular elements defining a bearing structure 3 for a rear wheel 4 and a fork 5 for a front wheel 6. Handlebars 41 having a tubular structure are operatively connected to the fork 5 and to the frame 2.

The frame 2, at its lower portion, bears an axle of the pedal cranks or pedal units 7, of the conventional type, to actuate the rear wheel 4 through an electronically servo-assisted gearshift according to the invention, indicated in general with reference numeral 8.

The gearshift 8 comprises a rear gearshift group 9 and a front gearshift group 10. Rear gearshift group 9 includes a plurality of toothed wheels or sprockets 11 having different diameters and coaxial with the rear wheel 4. Front gearshift group 10 includes a plurality of toothed wheels or crowns or gearwheels 12, having different diameters and coaxial with the axle of the pedal cranks 7.

The toothed wheels 11 of the rear gearshift group 9 and the toothed wheels 12 of the front gearshift group 10 can be selectively engaged by a closed loop motion transmitting chain 13, to provide the different gear ratios available, through the electronically servo-assisted gearshift 8.

The different gears ratios can be obtained by moving a chain guide element (cage) of a rear derailleur 14 of the rear gearshift group 9 and/or a chain guide element (cage) of a front derailleur 15 of the front gearshift group 10.

In the respective derailleur 14, 15, the rear chain guide element and the front chain guide element are moved by a respective electric motor 16, 17 (FIG. 2), typically equipped with a reducer and associated with the chain guide element through an articulated parallelogram linkage. Alternatively, it is possible to use other types of motor or other types of actuator or linkage that are well known in the art, for example a rack or worm screw system, for example the one described in U.S. Pat. No. 6,679,797, incorporated herein by reference.

Figure 2:
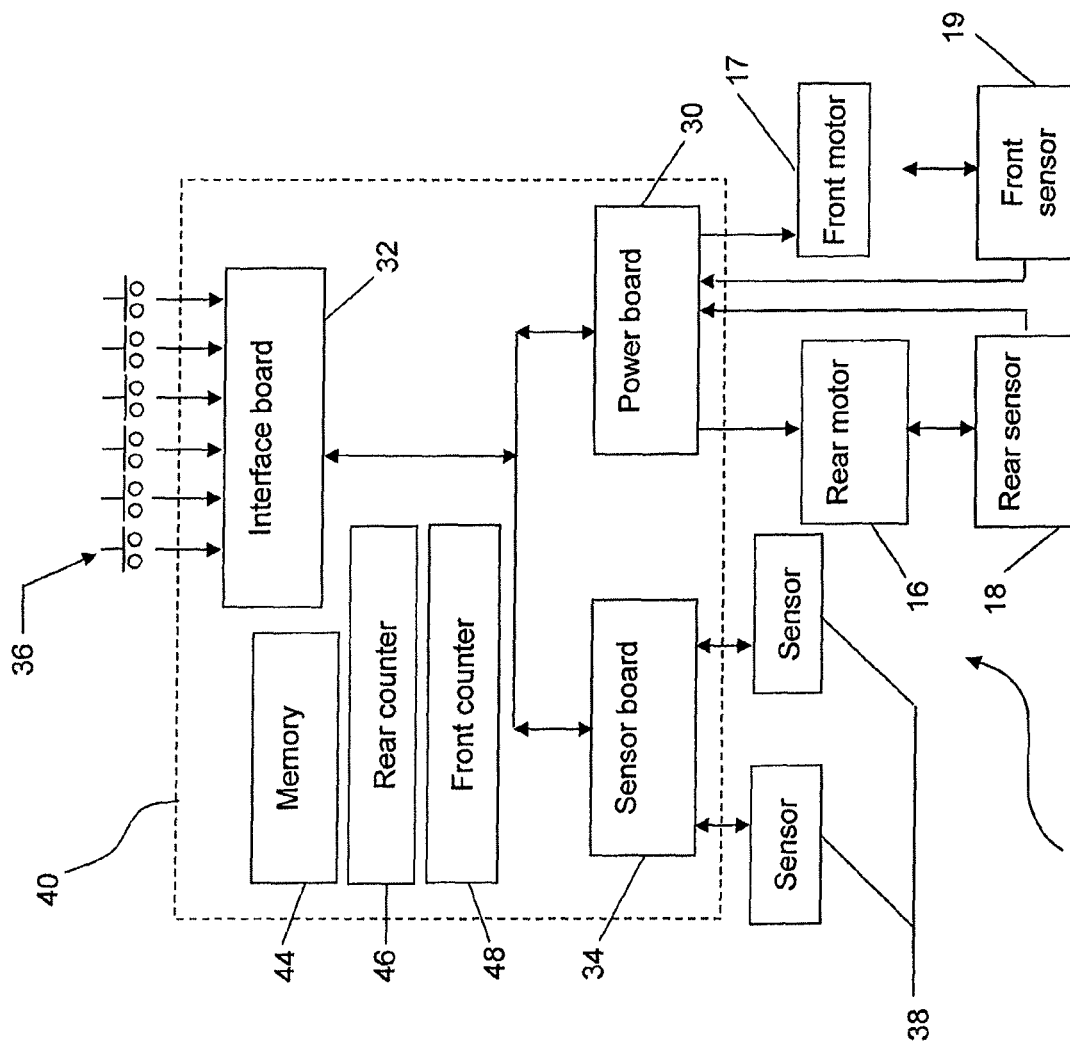
FIG. 2 illustrates a block diagram of the electrical and electronic part of the electronically servo-assisted gearshift according to an embodiment of the present invention, FIG. 3 schematically illustrates a data structure used according to the present invention.

The derailleurs 14, 15 typically comprise a respective position, speed and/or acceleration sensor 18, 19 (FIG. 2). The sensor can be associated with the rotor of the motor 16, 17, or with any mobile part "downstream" of the rotor, down to the chain guide element itself.

The details of the construction of the derailleurs 14, 15 are not illustrated here since the present invention lies outside their specific construction. For more details, reference shall be made for example to the description of the patent applications and patents quoted above.

FIG. 2 represents, in the form of a block diagram, the electrical and electronic part of the electronically servo-assisted gearshift according to an embodiment of the present invention.

An electronic power unit or board 30, equipped with a battery, supplies the electrical power to the motors 16, 17 and to the sensors 18, 19 of the derailleurs 14, 15, to an electronic board referred to hereinbelow as interface unit or board 32, and possibly to an electronic board referred to hereinbelow as sensor board or unit 34. The battery is preferably of the rechargeable type and the rear derailleur 14 can include, in a per sé known way, a dynamo-electric unit to recharge the battery. In FIG. 2, the power supply lines are not shown for the sake of simplicity.

The electronic power board 30, the interface unit 32 and the sensor unit 34 as a whole form an electronic controller or control electronics 40 of the electronically servo-assisted gearshift 8. Alternatively, there can be a single electronic board or a different number of electronic boards.

In the present description and in the attached claims, therefore, under electronic controller or control electronics 40 a logic unit shall be meant, which can however be formed of many physical units, in particular of one or more distributed microprocessors that can be contained for example in the electronic power board 30, in the interface unit 32 and/or in the sensor unit 34.

The electronic power board 30 is housed for example in one of the tubes of the handlebars 41 or in one of the tubes of the frame 2, for example at a support for a drinking bottle (not illustrated). The interface unit 32 is housed for example in one of the tubes of the handlebars 41 or in a grippable device or manual control device 42 mounted on it. The sensor board 34 is housed for example in one of the tubes of the frame 2, near to the sensors associated therewith.

The transfer of power, data and information among the various components is carried out through electric cables, advantageously housed inside the tubes of the frame 2. The transfer of data and information signals can also take place in wireless mode, for example with Bluetooth protocol.

During travel, the rear and front derailleurs 14, 15 are controlled by the electronic controller 40 based on upward or downward gearshifting request signals entered by manual control devices 42, or semi-automatically or automatically by the electronic controller 40 itself. The manual control devices 42 can for example comprise levers or buttons suitable for switching the state of switches 36 connected or arranged on the interface unit 32. The switches 36 can be directly actuatable or each one through a lever, or two buttons can be actuatable by a swing lever.

Typically, there are levers or buttons (FIG. 2) arranged on or near a handgrip of the handlebars 41 for the upward and downward gearshifting signals, respectively, of the rear gearshift group 9, and levers or buttons arranged on or near the other handgrip of the handlebars 41 for the upward or downward gearshifting signals of the front gearshift group 10. There are typically also levers or buttons for actuating one or more of the switches 36, which are intended to control auxiliary functions, like for example the selection of an operating mode.

In the gearshift 8, the electronic controller 40 and more specifically the sensor unit 34 preferably also has one or more sensors 38 of travel parameters, such as the travel speed, the speed of rotation of the pedal cranks, the slope of the travel terrain, the heart rate of the cyclist and the like, associated therewith.

In an embodiment, the electronic controller 40, in order to actuate a gearshifting, actuates the motor 16, 17 and, based on the signal of the sensor 18, 19, stops the motor 16, 17 when the desired gear ratio has been reached, namely when the chain guide element of the derailleur 14 or 15 has reached such a position as to allow the correct engagement of the chain 13 with the desired toothed wheel 11 or 12, for example the wheel adjacent (having a larger or smaller diameter, respectively) to the one at which it was located when the (upward or downward, respectively) gearshifting command was generated through the manual control device 42 and the switch 36, and/or by the electronic control unit 40, based on the output of the sensors of the travel parameters 38. The desired toothed wheel may not be adjacent to the starting toothed wheel, in the case of multiple gearshifting.

In an alternative embodiment, the motors 16, 17 are driven for a time or for a number of steps or with a voltage value that are appropriate for each upward or downward gearshifting and then automatically stopped, while the sensors 18, 19 are only optionally present and in such a case are used to provide a feedback signal to the electronic controller 40 so that it can possibly take care of actuating the motors 16, 17 again in case the physical position that brings the chain 13 in engagement with the desired toothed wheel 11 or 12 has not been reached. This may for example be due to the fact that the resisting torque offered by the derailleur 14, 15, which to a certain extent depends on how the cyclist is pedaling, was too high, greater than the maximum torque which can be delivered by the motors through the linkage.

The motors 16, 17 can for example be stepper motors. Preferably, the motors 16, 17 are DC brush motors that are driven by a suitable number of "steps", each corresponding to a fraction of a revolution, more preferably to one thirty-second of a revolution. The choice of such a fraction is advantageous for processing, since it is an integer multiple of 2.

The electronic controller 40 further comprises memory means 44, based on which the electronic controller 40 determines the command values of the actuators such as to position the chain 13 in engagement with the toothed wheels 11, 12 desired on each occasion.

The electronic controller 40 can implement a rear counter 46 and a front counter 48. The counters 46, 48 can for example each be made of a register or of a variable stored in a memory cell. The electronic controller 40, in the normal ride operating mode of the gearshift 8, drives the derailleurs 14, 15 and keeps track of their current position by increasing or decreasing the counters 46, 48, for example by one unit for each step imposed on the motor 16, 17 and/or based on the reading of the sensors 18, 19. The counters 46, 48, where provided for, express the current position of the derailleurs 14, 15 in the same unit of measurement as the command values stored in the memory means 44. In this case, the counters 46, 48 can also act as sensors 18, 19.

The memory means 44 of the command values and the counters 46, 48 are shown as stand-alone parts of the electronic controller 40, but they can be physically implemented in one or more of the memory devices present in the electronic boards 30, 32, 34.

In simpler bicycles, there can be only the rear gearshift group 9 or only the front gearshift group 10, with the simplifications to the above that will be manifest to those skilled in the art.

For easiness of explanation, hereinafter the rear gearshift group is referred to in particular. What follows is applicable, alternatively or additionally, to the front gearshift group, mutatis mutandis.

Figure 3:
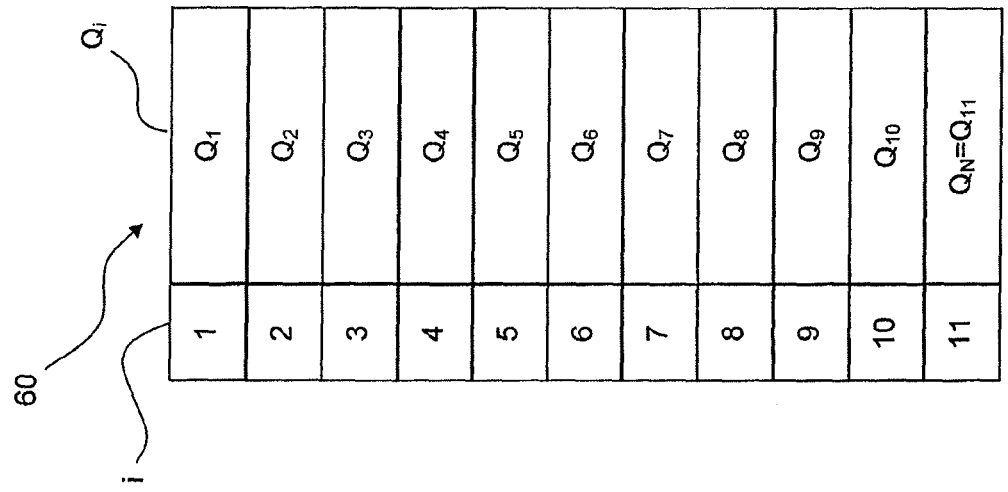

FIG. 3 illustrates a data structure, stored in a memory area of the electronic controller 40, like for example the aforementioned memory 44, or in any case accessible thereto, wherein the command values $Q_i$ of the actuator are stored in the form of a table 60, with i being an integer number between 1 and N, for each toothed wheel or sprocket of a gearshift group. In the example case of a rear gearshift group containing eleven sprockets, the table comprises the command values from $Q_1$ to $Q_{11}$.

More specifically, the command value $Q_1$ represents, in a suitable measurement unit, the theoretical condition of the gearshift in which the chain 13 is in such a physical position as to engage on the sprocket 11 having the smallest diameter of the rear gearshift group 9; the command value $Q_2$ represents the condition, in the same measurement unit, in which the chain 13 is in such a physical position as to engage on the sprocket 11 adjacent thereto of the rear gearshift group 9; etc. up to the command value $Q_N$—in the case illustrated $Q_{11}$—which represents the condition, again in the same measurement unit, in which the chain 13 is in such a physical position as to engage on the sprocket 11 having the maximum diameter of the rear gearshift group 9.

The command values $Q_i$ are preferably stored in the factory as values, called "nominal values", referring to a standard or reference gearshift and possibly adjusted later, as values called "actual values", to take misalignments between the chain 13 and one or more toothed wheels 11 into account, caused for example by impacts or collisions, or by small differences between the size and/or position of a replaced toothed wheel and the replacement one, as well as size differences of the components of the frame and the mounting tolerances of the gearshift, and by size differences inside the pack of toothed wheels with respect to the theoretical reference gearshift on which the nominal values are based.

For example, each command value $Q_i$ can be expressed as a value, possibly stored in the counter 46, that the output of the sensor 18 must take up or as a value of a driving quantity of the motor 16.

For example, when the actuator comprises a stepper motor or a motor driven by fractions of a revolution as stated above, each command value $Q_i$ can be expressed as the number of steps necessary to reach the condition of engagement with the i-th toothed wheel, starting from a reference position, corresponding for example to an end of stroke position or to the condition of lack of excitation of the motor 16 or to the condition of engagement with the toothed wheel having the smallest diameter.

Each command value $Q_i$ can also be expressed as the position of a specific point of the actuator or of the chain guide element, or as the distance of such a point, for example in millimeters, from a reference plane, for example taken on the bicycle, or in the condition of engagement with a reference toothed wheel. Furthermore, each command value $Q_i$ can be expressed as the value of a power supply voltage of a motor 16 that causes a movement of the chain 13 proportional thereto, or in other ways, according to the type of actuator, as will be understood by those skilled in the art.

Each command value $Q_i$ can also be expressed in a differential manner, with reference to the adjacent toothed wheel, for example as the distance to be traveled, as the number of steps to be carried out, as the actuation time of the actuator, etc., according to the type of actuator, as will be understood by those skilled in the art. In this case, for each toothed wheel there will more precisely be a command value starting from the toothed wheel of immediately smaller diameter and a command value starting from the toothed wheel of immediately greater diameter, the changes to be made to what follows being within the skills of those skilled in the art. In an even more elaborate embodiment, there can be, for each toothed wheel and for each direction from which it is reached, a command value based on which to bring the chain temporarily for the engagement operation, and a command value based on which to bring the chain upon successful engagement.

For the sake of easiness, reference shall be made to the case of command values $Q_i$ expressed in a proportional measurement unit.

Table 60 of FIG. 3 also indicates a field i having values from 1 to N, in this particular case from 1 to 11. However, it should be understood that in a practical implementation, this field can be absent should the command values $Q_i$ be stored sorted by diameter of the corresponding toothed wheel. Indeed, table 60 will be looked at, as better described hereinafter, each time obtaining a specific value $Q_i$ based on the value of a current index i=1 ... N. If the values $Q_i$ are sorted, it will therefore be sufficient to look at the i-th value in the table 60.

Although in FIG. 2 a single memory 44 is shown schematically, it should be understood that in practice there can be various storage devices. Preferably, the nominal command values $Q_i$ are stored in an EEPROM memory or in a read only memory, for example a ROM, while the actual command values are stored in the same or in another EEPROM memory or in a read and write memory.

Although a single table of command values is shown for greater clarity, both the nominal command values and the actual command values could also be stored in a common data structure or in distinct tables.

In the present description reference is made to the command values in use, be they the nominal one or the actual ones, and reference is made to a single table of values 60, irrespective of the fact that there can be two distinct tables for the nominal values and for the actual values.

During a normal ride operating mode, should it be necessary to carry out a change of gear ratio bringing the chain 13 to engage the i-th toothed wheel, the electronic control unit reads from table 60 the command value $Q_i$ associated with the i-th toothed wheel and drives the actuator and in particular the motor 16 as a consequence.

In particular, in case the motor 16 is of the stepper type or actuated by "steps" each one equivalent to a fraction of a revolution as stated above, it is driven to move by one step at a time or by a certain number of steps at a time.

Preferably, the origin of the reference system for the command values $Q_i$ is selected at the A-th first toothed wheel, namely $Q_1=0$.

It should be understood that the command values can increase for toothed wheels of increasing diameter, or increase for toothed wheels of decreasing diameter.

The control method according to the invention, described in detail hereinafter, can be implemented in a controller marketed together with a derailleur, but independently of the toothed wheels, the chain and the other components of a gearshift.

The electronic control of the gearshift according to the invention will now be described with reference to FIG. 4, which illustrates an example flow chart of an embodiment thereof, and to FIGS. 5-10, which are schematic time charts illustrative of the operation of the electronic gearshift 8 controlled according to the flow chart of FIG. 4.

In a block 101, a check counter NC is initialized to a maximum number of controls or checks MAXC that the position of the derailleur is an intended position, namely a default one of the gearshift or the one in accordance with the last gearshifting performed. The maximum number of checks MAXC is selected, together with the value of a time period MAX2 between two successive checks described hereinafter with reference to block 118, experimentally, as a function of the speed and the total unintentional movement time observed in the gearshift model. Such a time and speed are a function of the elasticity of the linkage arranged between actuator and chain guide element. The value MAXC can be selected, for example, of a few tens.

More specifically, the intended position is the one in which the preselected variable of the derailleur as described above takes up the predetermined value Qi of table 60, which allows the positioning of motion transmitting chain 13 in engagement with the intended i-th toothed wheel 11, 12, which for example will be the one having the smallest diameter (i=1 according to table 60) upon switching on, the one (of index i=i'+1 according to table 60) immediately subsequent to the toothed wheel 11 previously engaged (of index i' according to table 60) after performing a single upward gearshifting, the one (of index i=i'−1 according to the table 60) immediately preceding the toothed wheel 11 previously engaged after performing a single downward gearshifting, or a toothed wheel not immediately subsequent or preceding in the case of multiple upward or downward gearshifting, respectively.

In a subsequent block 102, a repositioning operations counter NR is initialized to a maximum number of repositioning operations MAXR of the derailleur to be carried out when it is not in the intended position. The maximum number of repositioning operations MAXR is selected based on the conflicting requirements of maintaining a position of the derailleur that is as accurate as possible on the one hand and, on the other hand, of not placing excessive strain on the mechanical parts, preserving electrical energy and not overloading the control electronics 40. The value MAXR can be selected, for example, as equal to a few units. A number of repositioning operations too high could lead to excessive strain on the mechanical parts of the derailleur, besides too much consumption of the battery: after a few repositioning operations it is preferable to give up repositioning and wait for the cyclist to realize that the motion transmission system is not running properly and therefore to change gear ratio.

The maximum number of repositioning operations MAXR is preferably less than the maximum number of checks MAXC.

In a subsequent block 103, a counter or first timer T1 is initialized to a value MAX1 that represents a first time period after which it is wished to perform a check that the position of the derailleur is the intended position, between one gearshifting and the other.

As discussed in the introductory part of the present disclosure, the position of the derailleur may not have remained the intended one—reached during the movement imparted to the derailleur—due to undesired movements, which may even be microscopic.

The first time period MAX1 is comparatively long with respect to the second time period MAX2 described hereinafter with reference to block 118, for which reason sometimes in the rest of the present disclosure and in the attached claims the expressions comparatively long timer T1, comparatively long time period MAX1, comparatively short timer T2, comparatively short time period MAX2 will be used.

The first time period MAX1 can be selected, for example, as a few tens of seconds. The first time period MAX1 can be expressed in a suitable scale.

In a subsequent block 104, it is checked whether there is a gearshifting request signal. This signal can be generated by the cyclist or automatically by the control electronics 40 based on the outputs of the sensors 38 of the travel parameters as stated above.

In case the check of block 104 gives a negative outcome, in a block 105 it is checked whether the first time period MAX1 has elapsed, namely—in the embodiment shown—whether the first timer T1 has finished the countdown and therefore T1=0.

In case the first time period MAX1 has not elapsed, output NO of block 105, in a block 106 the value of the timer T1 is decreased, typically by a unit of the same scale as the first time period MAX1, and performing of block 104 of checking whether there is a gearshifting request signal is returned to.

If there is no gearshifting request signal for the duration of the first time period MAX1, at the end of such a time period MAX1 the first timer T1 will have finished the countdown and therefore T1=0 will be true, output YES from block 105.

In this case, in a block 107 the value of the check counter NC is set to zero. The zero value is set on the check counter NC for convenience in the block diagram, but as will be immediately seen, even with such a value of the check counter NC a check of the position is actually performed. Alternatively, it is possible to use a separate flag to indicate that the comparatively slow time period MAX1 has elapsed without gearshifting requests and actuations. After block 107, in a block 108 the actual position of the derailleur is obtained, reading the output of the respective sensor 18, 19.

In a subsequent block 109 it is checked whether the repositioning operations counter NR—which is decreased in a block 113 described hereinafter—is now at zero.

In the negative case, like at the first execution of block 109, in a subsequent block 110 it is checked whether the actual position of the derailleur corresponds to the intended one, apart from a suitably predetermined tolerance, which however can also be zero.

In the affirmative case, no corrective action is necessary and the value of the repositioning operations counter NR is brought back—or reconfirmed, in case it was not decreased—to the maximum number of repositioning operations MAXR in a block 111.

In case the actual position of the derailleur does not correspond to the intended one and it is not within the possible predetermined tolerance around such an intended position—output NO from block 110—, it is provided in a block 112 to actuate the motor 16, 17 of the actuator until the derailleur is in the intended position, possibly exploiting the output of the sensors 18, 19 as feedback signal as described above.

As soon as the derailleur is in the intended position, in a block 113 the value of the repositioning operations counter NR is decreased by one unit. It should be noted that in the absence of the feedback signal from the sensors 18, 19, it is assumed at the end of the block 112 that the derailleur is in the intended position.

Irrespective of the outcome of the check of block 110 whether the actual position of the derailleur corresponds to the intended one apart from the predetermined tolerance, after block 111 or blocks 112, 113, respectively, it is checked in a block 114 whether the check counter NC—which can be decreased in a block 122 described hereafter—is now at zero.

It should be noted that the same block 114 is reached in case the check of block 110 whether the actual position of the derailleur corresponds to the intended one apart from the predetermined tolerance is not carried out due to the repositioning operations counter NR running out (output YES of block 109).

In case the check counter NC is at zero, as occurs for example in the case now examined in which no gearshifting request command has been received during a time period MAX1, since the check counter NC has been set to zero in block 107, execution of block 103 is returned to, in which the comparatively long timer T1 is reset to the maximum value MAX1, and then to block 104 of checking whether there is a gearshifting request signal.

Before proceeding with the description of the block diagram following other assumptions the behaviour in the assumption followed of not receiving any command for a comparatively long time period MAX1 is summarized, with reference to the schematic time charts of FIGS. 5-7. It is assumed in such time charts that the maximum number of checks is MAXC=3 and that the maximum number of repositioning operations is MAXR=2.

FIG. 5 shows the case in which, after a comparatively long time period MAX1, the reading of the position (block 108) is within tolerance (output YES from block 110). Then another comparatively long time period MAX1 is waited and, thereafter, another reading of the position is carried out, which is assumed to again be within tolerance. Since the check counter NC is always brought back to the zero dummy value, the situation put forward can repeat indefinitely.

FIG. 6 shows the case in which, after a comparatively long time period MAX1, the reading of the position (block 108) is not within tolerance (output NO from block 110). A first repositioning is thus carried out (block 112), decreasing (block 113) by one unit the value of the repositioning operations counter NR, then another comparatively long time period MAX1 is waited and, thereafter, another reading of the position is carried out, which this time is assumed to be within tolerance. The repositioning operations counter NR is then brought back to the maximum value MAXR (block 111). As above, since the check counter NC is also brought back to the zero dummy value (block 107), the situation put forward can repeat indefinitely.

Finally, FIG. 7 shows the case in which, after a comparatively long time period MAX1, the reading of the position (block 108) is not within tolerance (output NO from block 110). A first repositioning is thus carried out (block 112), decreasing by one unit the value of the repositioning operations counter NR (block 113), then another comparatively long time period MAX1 is waited and, thereafter, another reading of the position is carried out, which once again has a negative outcome. Then a second repositioning is carried out, decreasing by one unit the value of the repositioning operations counter NR. Having assumed that the maximum number of repositioning operations MAXR is 2—or after a number MAXR of behaviours as described—, the repositioning operations counter NR thus reaches zero. After having waited another comparatively long time period MAX1, another reading of the position is carried out (block 108), but it is not checked whether it is within tolerance (output YES from block 109), and in any case repositioning operations are not carried out. Since the check counter NC is brought back to the zero dummy value after every comparatively long time period MAX1, this last situation can repeat indefinitely: the derailleur stays in the unintended position, until the subsequent gearshifting, even if its position is checked with frequency MAX1.

Indeed, as stated above after the maximum number of repositioning operations MAXR it is not considered suitable to move the derailleur 15 further so as not to stress too much the mechanics and not to consume too much power, preferring to wait for an intervention by the cyclist. Therefore, the check of whether the actual position is within tolerance (block 110) is also omitted. Vice-versa, the actual position of the derailleur is read in any case in block 108, to keep track of it and therefore have a precise starting point and be able to carry out corrections as needed to the command values read in table 60, especially in the case of a derailleur driven in a differential manner.

In the case of non-differential command values of the derailleur 15, keeping track of the actual position of the derailleur 15 can be avoided. In this case, blocks 108 and 109 could also have their positions inverted—and the relative outputs consequently adjusted—, therefore avoiding the reading of the actual position if the number of repositioning attempts NR has run out.

Vice-versa, after reading the actual position the check of whether the actual position is within the tolerance can in any case be carried out, namely by moving the check whether the number of repositioning attempts NR has run out (block 109) to the output NO of block 110 of checking whether the position is within tolerance, just before the repositioning block 112.

It is also possible for example to also implement a negative check counter and a possible alarm signal to the cyclist once a maximum value thereof has been passed. Indeed, such a situation may even not be particularly critical (position just outside of the tolerance), but it could require a revision of the mechanics of the gearshift or of the command values of the table 60.

Figure 4:
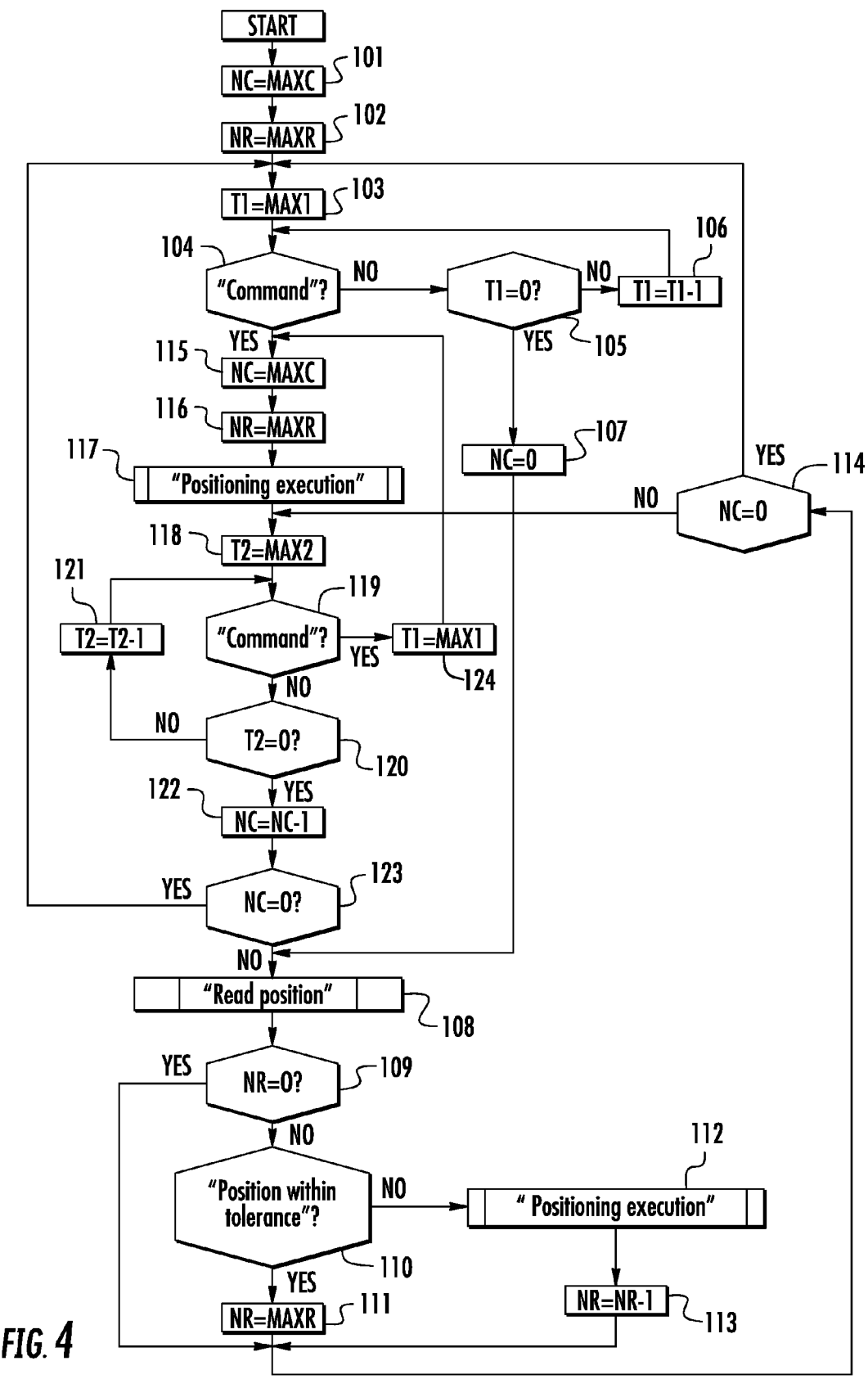
FIG. 4 illustrates an examplary flow chart of the electronic control of the gearshift according to the invention.

Turning back to the block diagram of FIG. 4, in case there is a gearshifting request signal during the elapsing of a comparatively long time period MAX1—output YES from block 104—, in blocks 115 and 116 it is first provided to return—or reconfirm, in case they were not decreased—the check counter NC and the repositioning operations counter NR to the respective maximum value MAXC and MAXR allowed.

Then, in a block 117 the motor 16, 17 of the actuator is actuated until the derailleur is in the intended position—which is a new intended position, at another toothed wheel—, possibly exploiting the output of the sensors 18, 19 as feedback signal as described above.

As soon as the derailleur is in the intended position, in a block 118 a counter or second timer T2 is initialized at a value MAX2 that represents a second time period after which it is wished to carry out a check that the position of the derailleur is the intended position. Also in this case, the position of the derailleur may not have remained the intended one—reached during the movement imparted on the derailleur executing the gearshifting (block 117)—due to undesired movements, which may even be microscopic, caused as stated above by the elasticity of the linkage of the derailleur 15 and/or by vibrations due to irregularity of the road surface.

It should be noted that in the absence of the feedback signal from the sensors 18, 19, it is assumed at the end of block 117 that the derailleur is in the intended position.

As stated above, the second time period MAX2 is comparatively short, since the Applicant has perceived that immediately after a gearshifting it is more likely that undesired microdisplacements of the derailleur occur.

The second time period MAX2 can be selected, for example, as a few tenths of a second. The second time period MAX2 can be expressed in a suitable scale, preferably in the same scale as the first time period MAX1.

In a subsequent block 119, it is checked whether there is a (second) gearshifting request signal.

In case the check of block 119 gives a negative outcome, in a block 120 it is checked whether the second time period MAX2 has elapsed, namely—in the embodiment shown—whether the second timer T2 has finished the countdown and therefore T2=0.

In case the second time period MAX2 has not elapsed, output NO of block 120, in a block 121 the value of the timer T2 is decreased, typically by one unit of the same scale of the second time period MAX2, and the execution of block 119 of checking whether there is a (second) gearshifting request signal is returned to.

If the (second) gearshifting request signal is not present for the duration of the second time period MAX2, at the end of such a time period MAX2 the second timer T2 will have finished the countdown and therefore T2=0 will be true, output YES from block 120.

In this case, in a block 122 the value of the check counter NC is decreased by one unit and then in a block 123 it is checked whether the check counter NC is now at zero.

In the negative case, like at the first execution of block 123, one proceeds with execution from block 108 described above, carrying out a reading of the position of the derailleur, a check whether the position is within tolerance and a possible repositioning, then returning to executing block 114 of checking whether the check counter NC is now at zero, which will necessarily give a negative outcome. There is thus cyclical return to executing block 118 and therefore to waiting again for a time period MAX2, to the decrease of the check counter NC (block 122) and to the possible check of the position and possible repositioning, until the check counter NC reaches the zero value. In this cyclical repetition, the possible check of the position and possible repositioning of step 112 are carried out only until the repositioning operations counter NR reaches the zero value.

When the check counter NC reaches the zero value, output YES from block 123, the execution of block 103 is returned to.

With the execution of blocks 118-123 now described a number NC of checks of the position are therefore carried out, at a strict frequency MAX2, possibly carrying out a maximum number of repositioning operations MAXR.

In case the check of block 119 gives a positive outcome, and therefore a (second) gearshifting request signal intervenes during one of the NC position checks at frequency MAX2, in a block 124 the first counter T1 is brought back to the maximum value MAX1 and then the execution of blocks 115-118 is returned to. Therefore, in particular the new gearshifting is actuated by bringing the derailleur into the (new) intended position, and all of the counters and timers are brought to the maximum, like at the start.

It is worthwhile emphasizing that, irrespective of the outcome of the checks following positioning executing a gearshifting (block 117) or following repositioning due to a position found to be outside of tolerance (block 112), a reading of the position is always carried out at least at each comparatively long time period MAX1.

Moreover, a predetermined number MAXC of checks are always carried out at each comparatively short time period MAX2 following positioning executing a gearshifting (block 117), irrespective of the outcome of the checks themselves.

Figure 8:
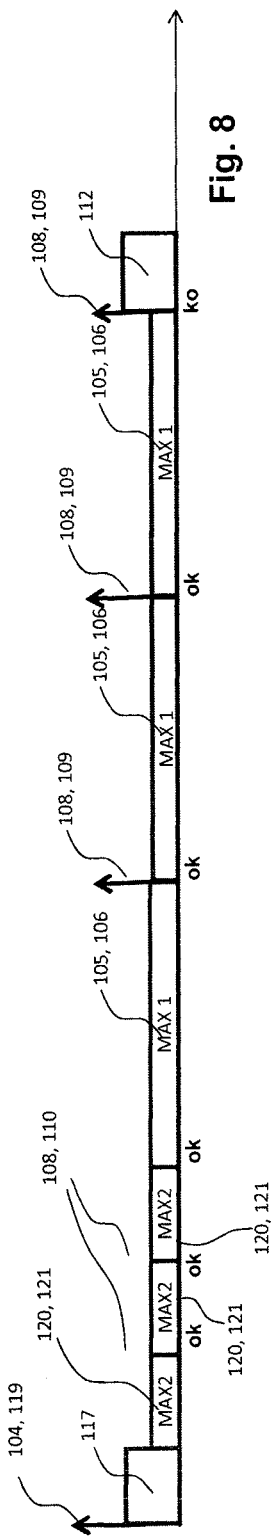
Figure 9:
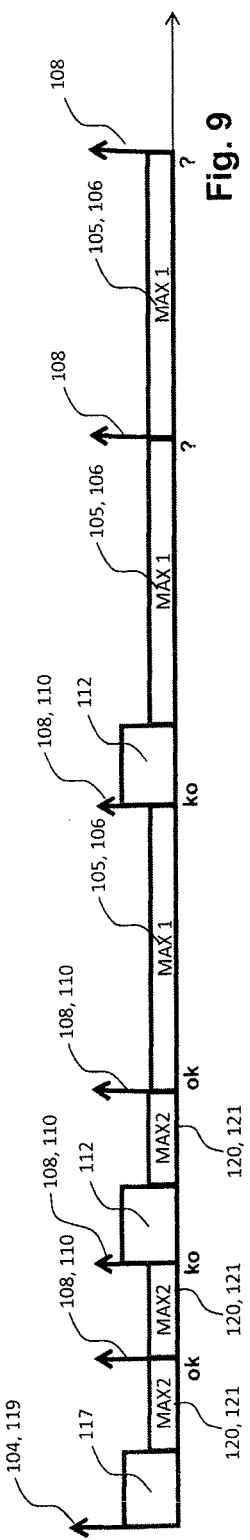
Figure 10:
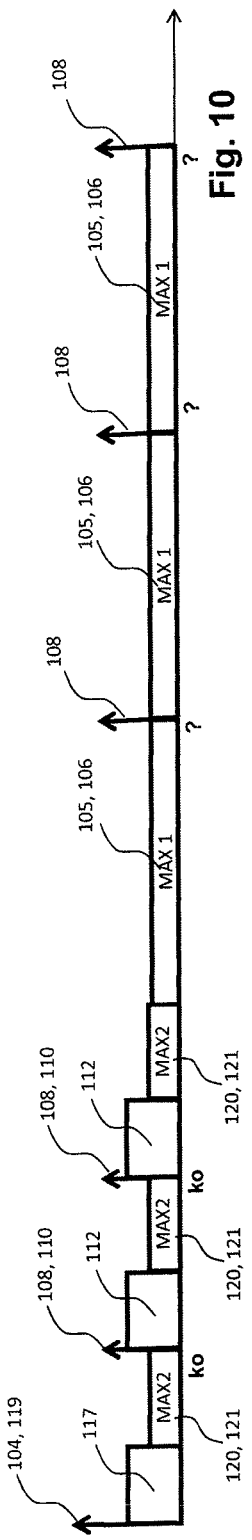

The behaviour in the followed assumption of receiving a gearshifting request signal will now be summarized, with reference to the schematic time charts of FIGS. 8-10. Analogously to FIGS. 5-7 described above, it is assumed in such time charts that the maximum number of checks is MAXC=3 and that the maximum number of repositioning operations is MAXR=2.

FIG. 8 shows the case in which, after a comparatively short time period MAX2 after actuating the gearshifting (block 117), the reading of the position (block 108) is within tolerance (output YES from block 110). Another comparatively short time period MAX2 is then waited and, thereafter, another reading of the position is carried out, which is assumed to be again within tolerance. Once again, for a third time a comparatively short time period MAX2 is waited and, since each time the value of the check counter NC is decreased by one unit (block 122) and since the maximum number MAXC of checks is 3 in the assumed case, the check counter NC then reaches zero. Then one moves on to waiting for a comparatively long time period MAX1, after which another reading of the position is carried out (block 108), with checking whether it is within tolerance, assumed to be positive (output YES from block 110).

As noted above, since the check counter NC is brought back to the zero dummy value (block 107) if gearshifting requests do not occur during the comparatively long time period MAX1, such reading of the position (block 108) with checking whether it is within tolerance can be repeated indefinitely.

If at a certain point in time the position is not within tolerance (output NO from block 110), as shown, a repositioning will be carried out (block 112) with related decrease (block 113) of the repositioning operations counter NR. Since such a repositioning operations counter NR is brought back to the maximum value only after a position reading within tolerance (block 111) or after a gearshifting request signal (block 116), at most a number MAXR of repositioning operations can be carried out at time periods MAX1.

FIG. 9 shows the case in which, after a comparatively short time period MAX2 after actuating the gearshifting (block 117), the reading of the position (block 108) is within tolerance (output YES from block 110). Another comparatively short time period MAX2 is then waited and, thereafter, another reading of the position is carried out, which this time is assumed to be outside of tolerance (output NO from block 110).

A first repositioning is then carried out (block 112), decreasing (block 113) the value of the repositioning operations counter NR by one unit, then another comparatively short time period MAX2 is waited.

Since the number of checks NC has now reached zero, there is cyclical repetition of the waiting for a comparatively long time period MAX1, of carrying out another reading of the position (block 108), and of checking whether it is within tolerance (block 109). If the position is not within tolerance (output NO from block 110), as shown, a repositioning will be carried out (block 112) with related further decrease (block 113) of the repositioning operations counter NR. Since such a repositioning operations counter NR is at this point at zero in the case of maximum number of repositioning operations MAXR=2, at the next reading of the position it is not checked whether it is within tolerance and in any case the derailleur is not repositioned.

Finally, FIG. 10 shows the case in which, after a comparatively short time period MAX2 after actuating the gearshifting (block 117), the reading of the position (block 108) is not within tolerance (output NO from block 110). A first repositioning is then carried out (block 112), decreasing (block 113) the value of the repositioning operations counter NR by one unit, then another comparatively short time period MAX2 is waited and, thereafter, a second reading of the position is carried out, which is assumed to again not be within tolerance (output NO from block 110). A second repositioning is then carried out (block 112), decreasing (block 113) the value of the repositioning operations counter NR by one unit. Then another comparatively short time period MAX2 is waited and, thereafter, since the number of checks NC has now reached zero, there is the cyclical repetition of waiting for a comparatively long time period MAX1 and of carrying out another reading of the position; since the repositioning operations counter NR is however at this point at zero (output NO from block 109), the check whether the position is within tolerance (block 110) and the possible repositioning are not carried out, however. In any case, reference is made to what has been noted earlier on the order in which the steps 109 and 110 can be carried out.

In an alternative embodiment, just one or other of the check counter NC and the repositioning operations counter NR could be used, although with less degrees of freedom and/or carrying out a single check whether the position is within tolerance or a single repositioning.

It is also manifest that instead of using countdown counters it is possible to use incremental counters and/or that instead of using checks of the various counters on the value 0 it is possible to use checks on the value 1, by suitably changing the value of the corresponding maximum.

Moreover, it is manifest that it is possible to use timers operating according to a clock signal instead of according to the decrements set in blocks 106 and 121, the changes to the block diagram being within the capabilities of one skilled in the art.

In case the motor 16, 17 of the derailleur is of the stepper type or actuated by "steps" each one equivalent to a fraction of a revolution as stated above, it can be driven to move a comparatively large number of steps at a time for positioning to execute a gearshifting (block 117) and one step at a time or a comparatively small number of steps at a time for repositioning when position is found to be outside tolerance (block 112), during which the total movement is typically less than the distance between two toothed wheels.

The method outlined above can also be used in the case of automatic or semi-automatic operation of the bicycle gearshift, wherein the control electronics 40 establish—based on the outputs of the sensors 38 of the travel parameters—such as the travel speed, the rotation speed of the pedal cranks, the slope of the terrain, the heart rate of the cyclist and similar—when it is suitable to change gear ratio and automatically generate the signals requesting movement of the derailleur (automatic operation) or carry out a supervision/integration of the cyclist's requests, preventing them, bypassing them, delaying them and/or integrating them with automatically generated requests, or vice-versa proposing such requests to the cyclist that in any case has the option to bypass them (semi-automatic operation).

The method outlined above can also be used in the case in which the cyclist sends command signals for a change in gear ratio and the electronic controller 40 takes care of transforming them into a gearshifting request signal of the rear derailleur and/or into a gearshifting request signal of the front derailleur. The method outlined above can be implemented in any component 30, 32, 34 of the electronic controller 40, even in a manner distributed between two or three of such components 30, 32, 34.

The method outlined above can be implemented in a controller marketed together with a derailleur, but independently from the toothed wheels, from the chain and from the other components of a gearshift.

What is claimed is:
1. Method for electronically controlling a bicycle gearshift comprising at least one derailleur, comprising the sequential steps of:
   a) imparting through control electronics a movement on the derailleur of the gearshift until the derailleur is in an intended position;
   b) waiting through the control electronics for a predetermined time period;

c) performing through the control electronics a check whether the derailleur is in the intended position, within a possible predetermined tolerance; and d) in case said check has a negative outcome, imparting through the control electronics a further movement on the derailleur of the gearshift until the derailleur is in the intended position.

2. Method according to claim 1, wherein step a) of imparting a movement on the derailleur comprises actuating a motor of the derailleur and stopping it automatically when it is assumed that the derailleur is in an intended position, and carrying out a feedback control of the derailleur obtaining a feedback signal from at least one sensor, and optionally actuating the motor again in case the intended position has not been reached.

3. Method according to claim 1, wherein step a) is carried out as a consequence of a gearshifting request signal or to carry out a repositioning following a negative outcome of the check whether the position of the derailleur is the intended one, within a possible predetermined tolerance.

4. Method according to claim 1, wherein between two successive executions of said step a) to carry out a respective gearshifting, said step b) of waiting and a step c1) of reading an actual position of the derailleur, as well as optionally said steps c) and d), are carried out cyclically, wherein said predetermined time period is comparatively long, preceded by at least one execution of said steps b), c), d), wherein said predetermined time period is comparatively short.

5. Method according to claim 1, wherein step b) of waiting for a predetermined time period comprises monitoring the passing of time with at least one timer.

6. Method according to claim 1, wherein the intended position of the derailleur is a position that allows the positioning of a motion transmitting chain into engagement with a first of at least two coaxial toothed wheels, and it is evaluated based on a current value of a variable of the derailleur, wherein a predetermined value of the variable of the derailleur is provided for each toothed wheel associated with the derailleur.

7. Method according to claim 1, wherein step c) of checking is repeated a predetermined number of times irrespective of the outcome of each check, when said step a) is carried out to actuate a gearshifting.

8. Method according to claim 1, wherein said step d) is repeated at most a predetermined number of times before a second execution of step a) actuating a gearshifting consequent to a second gearshifting request signal.

9. Method according to claim 8, wherein each repetition of said step d) for the predetermined number of times can be carried out when said step c) of checking with a negative outcome is carried out after the comparatively short time period or when said step c) of checking with a negative outcome is carried out after the comparatively long time period.

10. Method according to claim 1, wherein if during said step b) of waiting there is a gearshifting request signal, the intended position is updated and the execution of step a) is returned to.

11. Electronically servo-assisted bicycle gearshift, comprising:
a chain and toothed wheels system for transmitting motion from an axle of the pedal cranks to a driving wheel of the bicycle, said motion transmission system comprising at least two toothed wheels that are coaxial along an axis selected from the axle of the pedal cranks and the axis of the driving wheel,
at least one derailleur comprising a chain guide element and an actuator of the chain guide element to move the chain into engagement with a preselected toothed wheel of said at least two coaxial toothed wheels, and
the control electronics comprising modules adapted to carry out the method according to claim 1.

12. Gearshift according to claim 11, wherein said actuator comprises a DC brush motor driven by a number of, each one of the steps corresponding to a fraction of a revolution, more preferably to one thirty-second of a revolution.

13. Derailleur comprising a chain guide element and an actuator of the chain guide element to move a chain into engagement with a preselected toothed wheel of at least two coaxial toothed wheels, and the control electronics comprising modules adapted to actuate the method according to claim 1.

14. Bicycle comprising an electronically servo-assisted bicycle gearshift according to claim 11.

* * * * *

UNITED STATES PATENT AND TRADEMARK OFFICE
CERTIFICATE OF CORRECTION

PATENT NO.       : 9,037,368 B2                                              Page 1 of 1
APPLICATION NO.  : 13/948686
DATED            : May 19, 2015
INVENTOR(S)      : Federico Miglioranza It is certified that error appears in the above-identified patent and that said Letters Patent is hereby corrected as shown below:

IN THE CLAIMS

Claim 12, column 18, line 31, after "number of" insert -- steps --.

Signed and Sealed this
Twenty-ninth Day of September, 2015

Michelle K. Lee
*Director of the United States Patent and Trademark Office*